(12) United States Patent
Williams et al.

(10) Patent No.: US 9,969,277 B2
(45) Date of Patent: May 15, 2018

(54) ELECTRIC VEHICLE AC POWER ADAPTER

(71) Applicants: Wendell David Williams, Waterford, MI (US); Gary J Burlak, Lake Orion, MI (US)

(72) Inventors: Wendell David Williams, Waterford, MI (US); Gary J Burlak, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 950 days.

(21) Appl. No.: 14/135,667

(22) Filed: Dec. 20, 2013

(65) Prior Publication Data

US 2015/0175023 A1    Jun. 25, 2015

(51) Int. Cl.
*B60L 11/18* (2006.01)
*B60L 3/00* (2006.01)
*B60L 3/04* (2006.01)

(52) U.S. Cl.
CPC ......... *B60L 11/1818* (2013.01); *B60L 3/0069* (2013.01); *B60L 3/04* (2013.01); *B60L 11/1824* (2013.01); *B60L 11/1842* (2013.01); *B60L 2230/12* (2013.01); *Y02E 60/721* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y04S 10/126* (2013.01)

(58) Field of Classification Search
USPC .......................................................... 307/9.1
See application file for complete search history.

(56) References Cited

U.S. PATENT DOCUMENTS

| | | | |
|---|---|---|---|
| 7,301,247 B2 | 11/2007 | Kishibata et al. | |
| 7,550,861 B2 | 6/2009 | Oyobe et al. | |
| 2011/0029144 A1* | 2/2011 | Muller | B60L 11/1816 700/293 |
| 2011/0074351 A1* | 3/2011 | Bianco | B60L 11/1816 320/109 |
| 2011/0202217 A1* | 8/2011 | Kempton | B60L 11/1824 701/22 |
| 2011/0276194 A1* | 11/2011 | Emalfarb | B60L 11/1838 700/297 |
| 2012/0025842 A1* | 2/2012 | Gibbs | G01R 31/045 324/538 |
| 2012/0091953 A1* | 4/2012 | Paryani | B60L 11/1844 320/109 |
| 2012/0206100 A1* | 8/2012 | Brown | B60L 3/0069 320/109 |
| 2012/0217928 A1* | 8/2012 | Kulidjian | B60L 3/0069 320/109 |
| 2012/0286729 A1* | 11/2012 | Yegin | B60L 3/0069 320/109 |

(Continued)

*Primary Examiner* — Jared Fureman
*Assistant Examiner* — Emmanuel R Dominique
(74) *Attorney, Agent, or Firm* — Ralph E Smith

(57) ABSTRACT

An AC power adapter for a plug-in electric vehicle has a connector for reception in a charging port of the plug-in electric vehicle, at least one AC outlet coupled to the connector and command generation circuitry coupled to the connector for generating a command that causes the plug-in electric vehicle to put itself into a power feedback mode wherein AC power generated by the plug-in electric vehicle and provided to its charging port is coupled through the connector to the AC outlet.

7 Claims, 2 Drawing Sheets

(56) References Cited

U.S. PATENT DOCUMENTS

| | | | |
|---|---|---|---|
| 2013/0187600 A1* | 7/2013 | Gale | B60L 11/1818 320/109 |
| 2014/0002020 A1* | 1/2014 | Geber | B60L 11/1818 320/109 |
| 2014/0033527 A1* | 2/2014 | Quek | H01F 27/306 29/832 |
| 2014/0035527 A1* | 2/2014 | Hayashigawa | B60L 11/1818 320/109 |
| 2014/0191705 A1* | 7/2014 | Takao | H02J 7/0054 320/103 |
| 2015/0162784 A1* | 6/2015 | Kydd | B60L 11/1811 307/9.1 |

* cited by examiner

ELECTRIC VEHICLE AC POWER ADAPTER

FIELD

The present invention relates to an AC power adapter for electric and hybrid electric vehicles.

BACKGROUND

A plug-in electric vehicle as that term is used herein is a full electric or hybrid electric vehicle that can be charged by plugging it into a charging station, commonly known as an Electric Vehicle Supply Equipment ("EVSE"). Newer plug-in electric vehicles conform to the SAE (Society of Automotive Engineers) J1772 standard (titled SAE Surface Vehicle Recommended Practice J1772, SAE Electric Vehicle Conductive Charge Coupler) to connect and charge. The J1772 standard covers the general physical, communication protocol, and performance requirements for the EVSE. The EVSE has a connector (or plug) that plugs into a port on the plug-in electric vehicle. The connector (or plug) and port each conform to the J1772 requirements. The connector is commonly referred to as a J1772 connector. A typical prior art J1772 connector is shown as connector 102 in FIGS. 1 and 2, FIG. 2 in particular. It should be understood however, that FIGS. 1 and 2 as a whole are not prior art.

J1772 connectors have a round housing surrounding five pins, two AC pins (AC line 1 and AC line 2), a pilot pin, a proximity pin and a ground pin. In accordance with the J1772 standard, a pilot signal (a 1 Khz square wave at +/−12 volts generated by the EVSE) is used for communication between the EVSE and the plug-in electric vehicle for detection of the presence of a vehicle, communicate the maximum allowable charging current and control charging. The pilot signal has a signaling protocol used to communicate commands and other information between the EVSE and the plug-in electric vehicle. The plug-in electric vehicle responds to the pilot signal on the pilot pin to appropriately configure the electric vehicle for charging and controls aspects of the charging in accordance with the signaling protocol specified in the J1772 standard. The proximity pin connects a proximity circuit in the plug-in electric vehicle to a proximity circuit in J1772 connector. This connection is required for charging of the plug-in electric vehicle to occur and disables the plug-in electric vehicle from moving when it is connected to the EVSE.

Recent plug-in electric vehicles can be set-up to feed power back into the power grid. This is typically done by a user entering the appropriate command (or commands) on a console of the electric vehicle. Such plug-in electric vehicles have high power inverters that convert the DC power from the main battery pack of the plug-in electric vehicle to AC power that is then fed back into the power grid, such as via an appropriately configured EVSE.

SUMMARY

In accordance with an aspect of the present disclosure, an AC power adapter for a plug-in electric vehicle includes a connector for reception in a charging port of the plug-in electric vehicle, at least one AC outlet coupled to the connector, and command generation circuitry coupled to the connector for generating a command that causes the plug-in electric vehicle to put itself into a power feedback mode wherein AC power generated by the plug-in electric vehicle and provided to its charging port is coupled through the connector to the AC outlet.

In an aspect, the AC power adapter includes an AC power adapter pilot signal generator and an AC power adapter proximity circuit and the command generation circuitry includes the AC power adapter pilot signal generator that generates a pilot signal with unique signaling protocol for the command. In an aspect, the command generation circuitry also includes the AC power adapter proximity circuit.

In an aspect, the AC power adapter includes a circuit protection device coupled between the AC outlet and the connector.

In an aspect, the J1772 connector houses the AC power adapter pilot signal generator and the AC power adapter proximity circuit.

In an aspect, the AC power adapter includes a power strip having the at least one AC outlet. In an aspect, the AC power adapter includes a plurality of the AC outlets. In an aspect, the power strip is coupled to the circuit protection device by a power cord and the circuit protection device is coupled to J1772 connector by a power cord.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
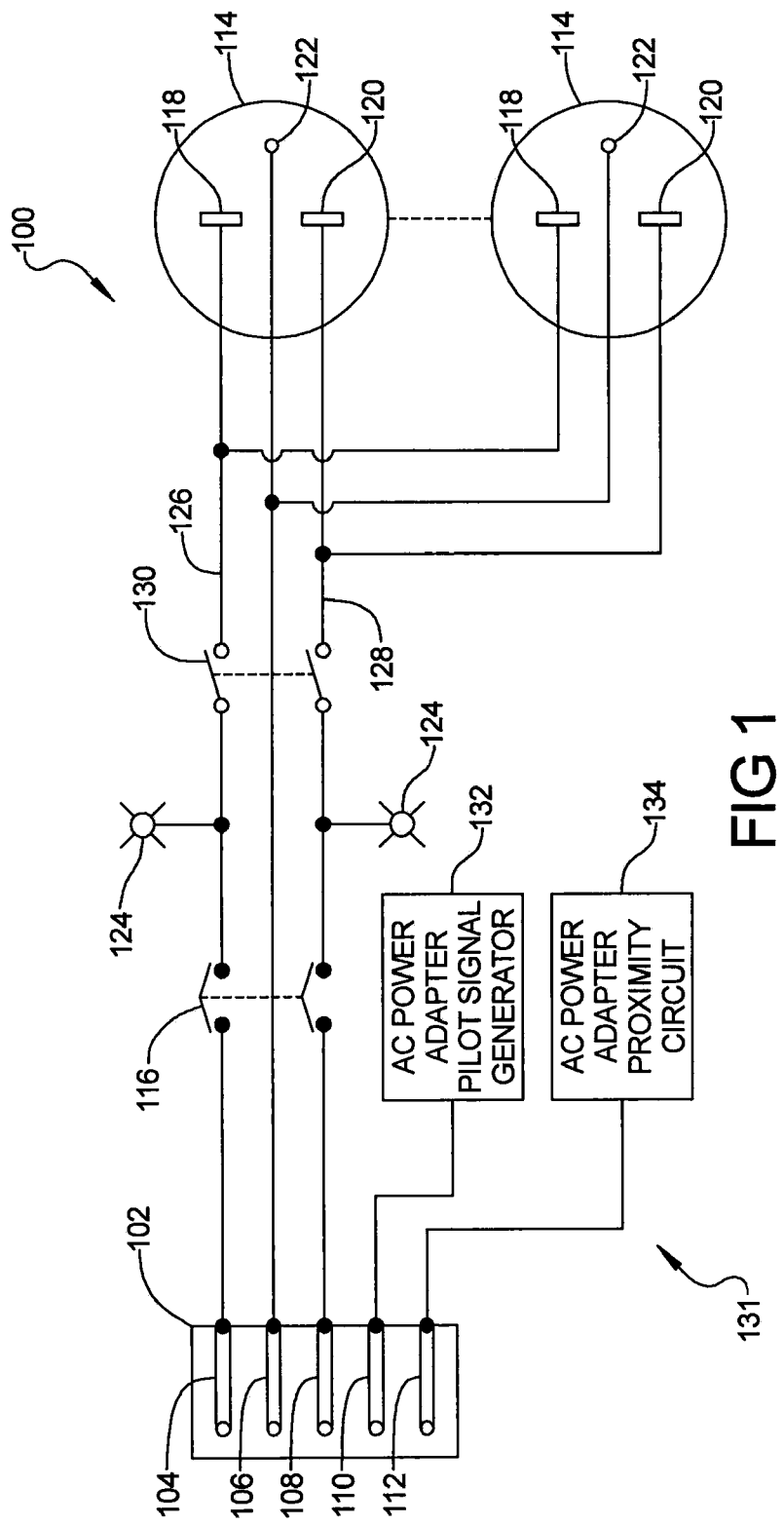
FIG. 1 is a basic schematic of an AC power adapter for a plug-in electric vehicle in accordance with an aspect of the present disclosure.

The following description of the preferred embodiment(s) is merely exemplary in nature and is in no way intended to limit the invention, its application, or uses.

With reference to the figures, a plug-in electric vehicle AC power adapter 100 has a J1772 connector 102 having two AC line pins 104, 108, a ground pin 106, a pilot pin 110 and a proximity pin 112. AC power adapter 100 also includes one or more AC receptacles 114, which may be standard 120 VAC NEMA receptacles or may be 120 VAC ground fault interrupter receptacles. It should be understood that AC receptacles 114 could be other than 120 VAC receptacles, such as 220 VAC receptacles. AC line pins 104, 108 are coupled through circuit protection device 116 to the respective AC contacts 118 (which may be the hot contact), 120 (which may be the neutral contact) of each AC receptacle 114 and ground pin 106 is coupled to ground contact 122 of AC receptacle 114. Circuit protection device 116 may be any known type of circuit protection device, such as a circuit breaker or fuse. Circuit protection device 116 may also include a ground fault interrupter circuit, particularly if AC receptacle(s) 114 are not ground fault interrupter receptacles. AC power adapter 100 may include visual indicators 124 coupled to AC lines 126, 128 connecting circuit protection device 116 to AC contacts 118, 120 of AC receptacle 114 that are illuminated when AC lines 126, 128 are hot. Visual indicators 124 may for example be light emitting diodes with associated circuitry to drive them. AC adapter may further include a switch 130 in series between circuit protection device 116 and AC contacts 118, 120 of AC receptacle(s) 114.

AC power adapter 100 further includes an AC power adapter pilot signal generator 132 coupled to pilot pin 110 and an AC power adapter proximity circuit 134 coupled to proximity pin 112. AC power adapter pilot signal generator 132 may illustratively be a square wave generator. AC power adapter proximity circuit 134 may illustratively be a voltage divider circuit. AC power adapter 100 also includes command generation circuitry 131 for generating a command for causing the plug-in electric vehicle to put itself into its power feedback mode. In the example embodiment shown in FIG. 1, command generation circuitry 131 includes AC power adapter pilot signal generator 132 and may also include AC power adapter proximity circuit 134. In an aspect, command generation circuitry 131 may include a switch (not shown) and indicator (not shown) to allow the interruption of the signal(s) generated by command generation circuitry 131 to enable/disable the AC power generation of the plug-in electric vehicle, which could be included in either AC power adapter pilot signal generator 132 or AC power adapter proximity circuit 134. Additionally the indicator could signal that AC power generation is active.

In operation, J1772 connector 102 is received in the charging port of a plug-in electric vehicle (not shown). AC power adapter 100 generates a command for causing the plug-in electric vehicle to put itself into its power feedback mode that it provides to the plug-in electric vehicle through J1772 connector 102. The plug-in electric vehicle responds to the command by putting itself into its power feedback mode where it generates AC power that is provided at its charging port. Illustratively, AC power adapter 100 generates the command by the AC power adapter pilot signal generator 132 generating a pilot signal having the appropriate signaling protocol to which the plug-in electric vehicle responds by putting itself in its power feedback mode where it generates AC power. This pilot signal may for example be a square wave signal with an appropriate frequency and duty cycle. The AC power is fed into AC power adapter 100 through AC line pins 104, 106 and ground pin 108 and to AC receptacles 114. AC power adapter proximity circuit illustratively generates a voltage level to identity to the plug-in electric vehicle that the AC power adapter is plugged in, which is illustratively a unique voltage level indicative that the device is an AC power adapter. It should be understood that AC power adapter proximity circuit 134 could be used in conjunction with AC power adapter pilot signal generator 132 to generate the command that is provided to the plug-in electric vehicle to cause it to put itself in its power feedback mode where it generates AC power.

Figure 2:
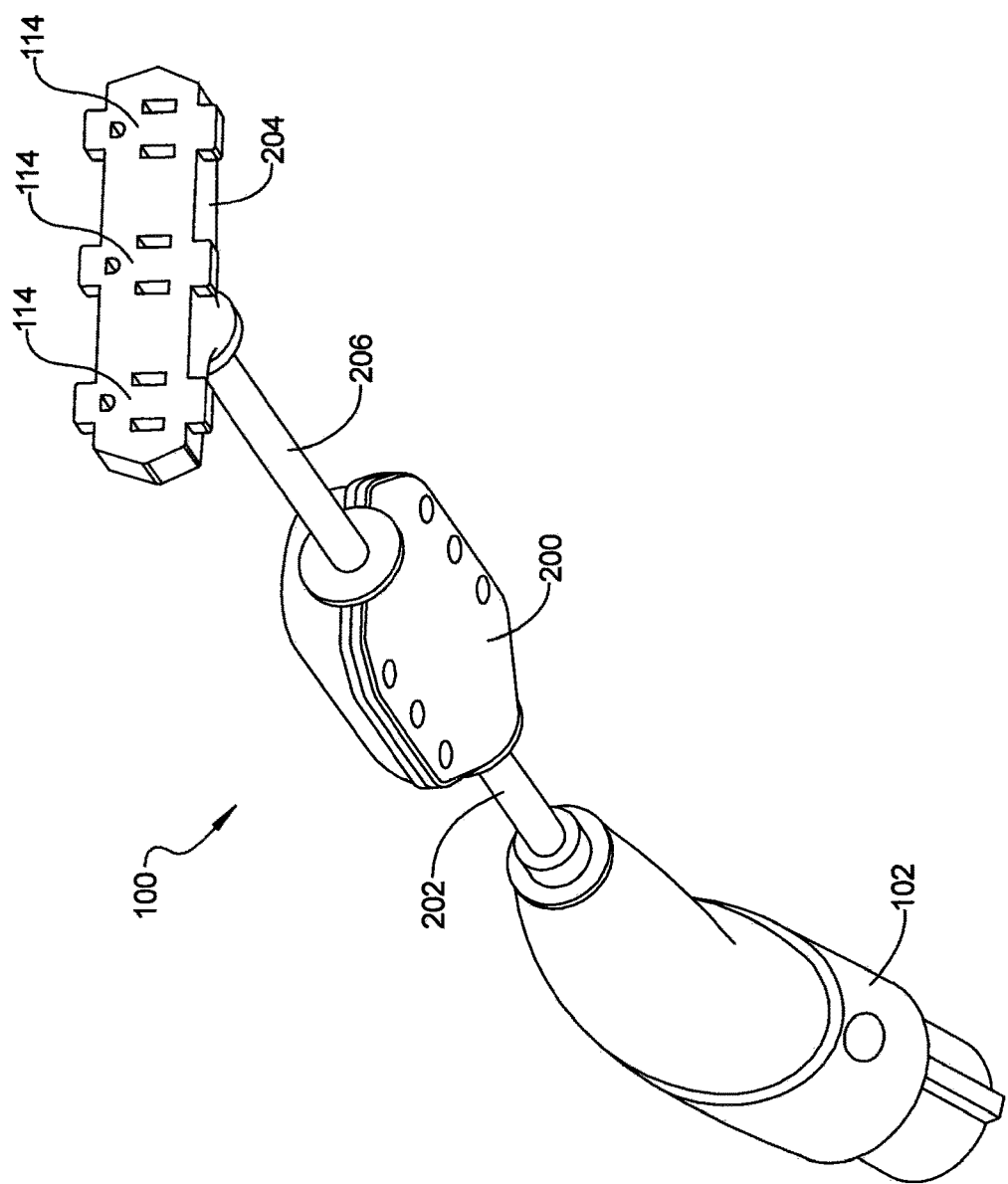
FIG. 2 is a perspective view of the AC power adapter of FIG. 1.

In an aspect, and with reference to FIG. 2, J1772 connector 102 houses command generation circuitry 131 including AC power adapter pilot signal generator 132 and AC power adapter proximity circuit 134. A housing 200 houses circuit protection device 116, visual indicators 124 and switch 130. J1772 connector 102 is coupled to housing 200 by a cord 202 that includes power lines and signal lines. AC power adapter 100 also includes a power strip 204 having AC receptacles 114. A power cord 206 couples power strip 204 to housing 200 and includes AC lines 126, 128. In an aspect, housing 200 could include AC receptacles 114 in which case power strip 204 could be dispensed with. In an aspect, J1772 connector could include circuit protection device 116, visual indicators 124 and switch 130 as well as command generation circuitry 131 and be coupled to power strip 202 by power cord 206. In an aspect, J1772 connector could also include AC outlets 114.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An AC power adapter for a plug-in electric vehicle, comprising:
    a connector for reception in a charging port of the plug-in electric vehicle;
    at least one AC outlet coupled to the connector; and
    command generation circuitry coupled to the connector for generating a command that commands the plug-in electric vehicle to put itself into a power feedback mode wherein AC power generated by the plug-in electric vehicle and provided to its charging port is coupled through the connector to the AC outlet, the command generation circuitry including an AC power adapter pilot signal generator that generates a pilot signal with signaling protocol for the command.

2. The AC power adapter of claim 1 wherein the AC adapter includes an AC power adapter proximity circuit.

3. The AC power adapter of claim 2 wherein the command generation circuitry also includes the AC power adapter proximity circuit.

4. The AC power adapter of claim 2 including a circuit protection device coupled between the AC outlet and the connector.

5. The AC power adapter of claim 4 wherein the connector houses the AC power adapter pilot signal generator and the AC power adapter proximity circuit.

6. The AC power adapter of claim 5 including a power strip having the at least one AC outlet, the power strip coupled to the housing by a power cord.

7. The AC power adapter of claim 6 wherein the power strip includes a plurality of the AC outlets.

* * * * *